2 Sheets--Sheet 2.

C. B. RUKGABEE & H. CLARKE
Fly-Trap.

No. 160,719. Patented March 9, 1875.

WITNESSES
E. H. Bates
J. R. Duffy

INVENTORS
Charles B. Rukgaber
Horace Clarke
J. E. Lathrop ATTORNEY

THE GRAPHIC CO.PHOTO-LITH.39 & 41 PARK PLACE,N.Y.

UNITED STATES PATENT OFFICE.

CHARLES B. RUKGABEE AND HORACE CLARKE, OF MOUNT PLEASANT, IOWA.

IMPROVEMENT IN FLY-TRAPS.

Specification forming part of Letters Patent No. 160,719, dated March 9, 1875; application filed February 20, 1875.

*To all whom it may concern:*

Be it known that we, CHARLES B. RUKGABEE and HORACE CLARKE, of Mount Pleasant, in the county of Henry and State of Iowa, have invented certain new and useful Improvements in Traps for the Capture and Destruction of Flies, &c.; and we do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
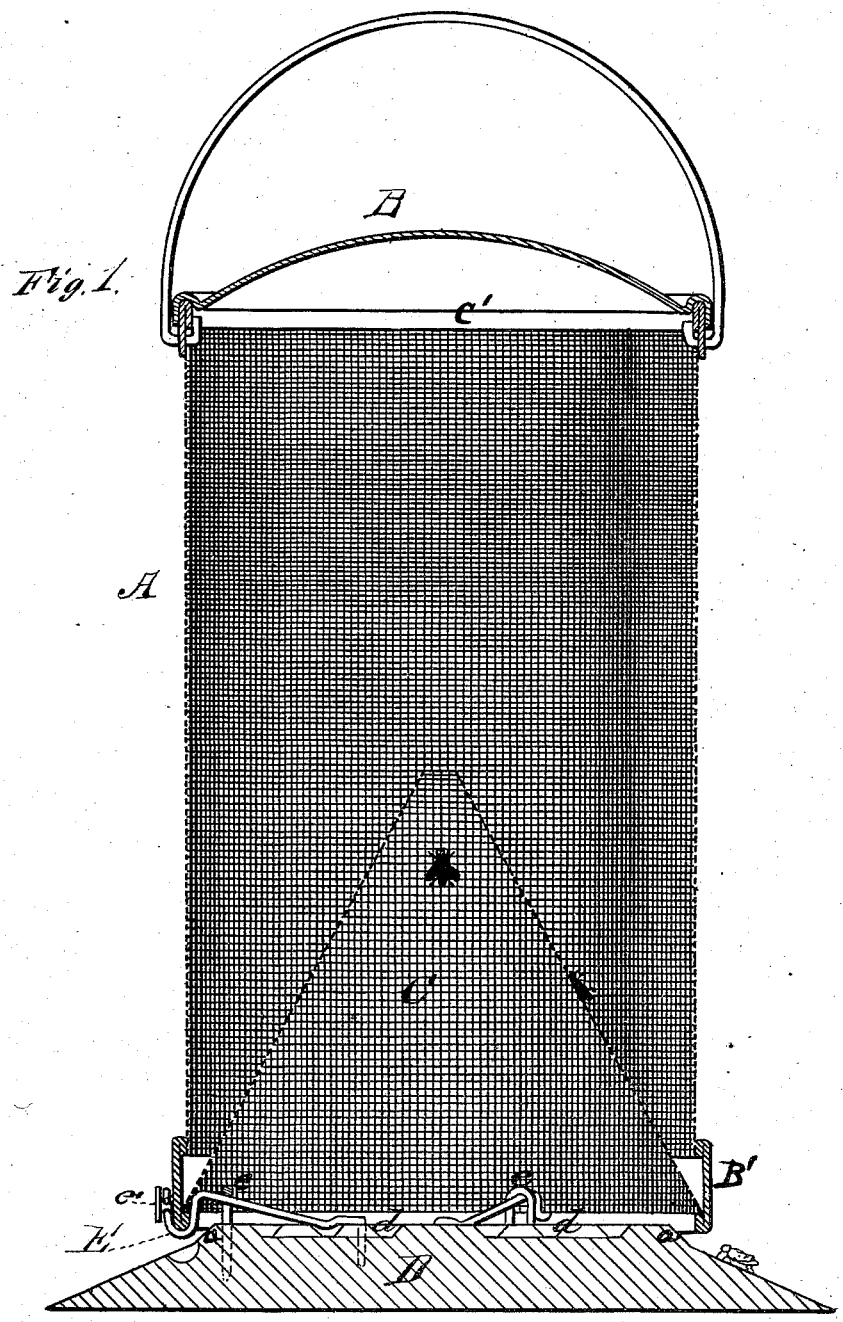
Figure 2:
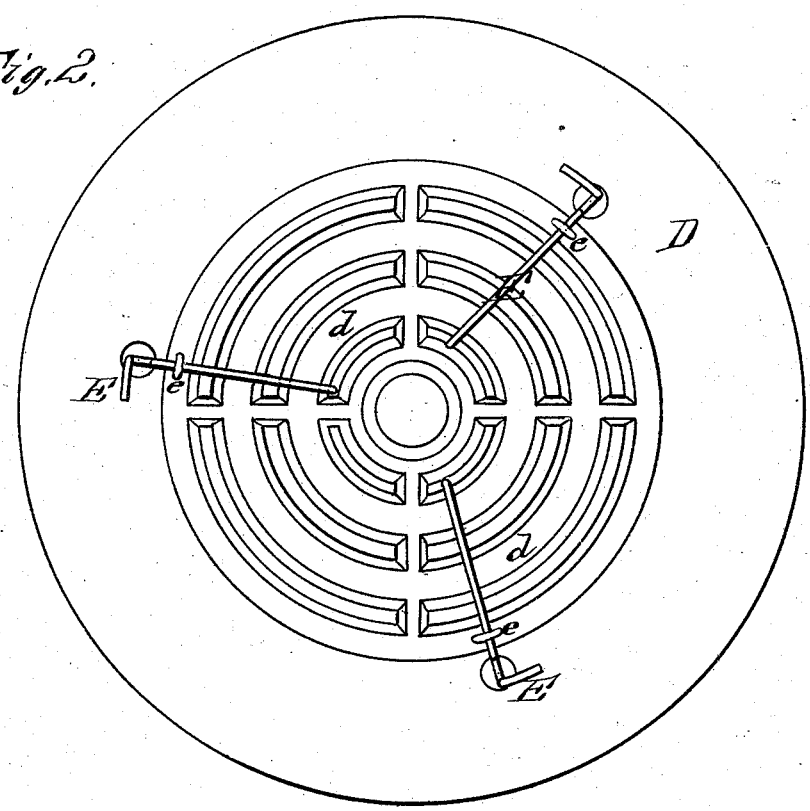
Figure 3:
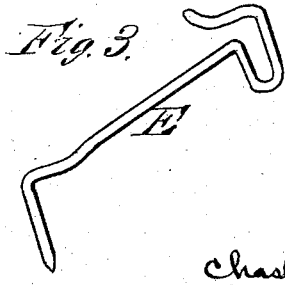

Figure 1 represents a vertical section of my improved fly-trap. Fig. 2 represents a top or plan view of the plate or base. Fig. 3 represents a spring detached.

Our invention relates to that class of inventions known as fly-traps; and has for its object a ready means of capturing flies by providing an adjustable bottom of a circular shape, with its surface from the lower extremity of its outer edge beveled back to a shoulder, which allows the flies to enter as they ascend. The bottom or base is also provided with grooves, furnishing dry standing-room between these grooves for the flies while taking their feed, which is placed in said grooves. After a number of flies or insects have entered, the operator drives them upward by striking the top of trap with the hand, leaving them free to fly or crawl up through the lower cone into the cylinder, where they perish. The base or feeding-trough is also provided with springs, which, when pressed down, close the space where they enter, and it remains closed until it is relieved, as will be more fully shown hereinafter.

A is a cylinder of wire-cloth, about ten inches long and six inches in diameter, with a band of tin, B', one and a half inch wide, around the bottom, and another band, C', one inch wide, around the top, into which bands the upper and lower edges of the wire-cloth are securely folded; also, a strip of tin, D' D', one-half inch wide, on each side, soldered at their upper and lower ends to the bands, and riveted to the wire-cloth, one serving to fasten the two ends of the wire-cloth together, forming the cylinder, and both to give to the cylinder permanent strength and durability. This cylinder is furnished with a close-fitting cover, B. Within this cylinder is a wire-cloth cone, C, the lower diameter of which is equal to that of the cylinder A, and it is secured in its place at the base of the cylinder by the lower edge of the tin band being folded over the edge of the wire-cloth of which the cone is formed. D is the bottom plate or base, of wood or other material, in a circular shape, with its upper surface from the lower extremity of its outer edge beveled about one and one-fourth inch back to a shoulder one-fourth of an inch deep, as seen at $a$, Fig. 1, leaving a surface of about five inches diameter in the center of the plate, in which are cut sundry grooves, $d$, about one-fourth of an inch wide and one-eighth of an inch deep, in which is to be placed the molasses or other bait to attract the insects, the spaces between the grooves furnishing dry standing-room for the flies while taking their feed, and leaving them free to fly or crawl up to the cone, and thence through a small aperture in the apex into the cylinder. On the bottom of the plate or base D are three or more springs, E, securely fastened near the center of base or plate D, and extending to its outer edge, where they are held in place by staples $e$, and bent at their ends to receive the cylinder A as it is pressed down, and is held in place by knobs $e'$, and is detachable by turning the cylinder to the left. These springs are bent or indented, so that they will fit upon and clasp the knobs $e'$, attached to the band, attaching the cylinder securely to the bottom plate about one-fourth of an inch above its beveled surface, and about the same distance outside of the shoulder $a$, giving the insects easy and unobstructed access to the grooved surface of the bottom plate D, where they will be attracted by the bait; and after finding the aperture by which they entered being obscured by the shoulder $a$, and a shade cast over the grooved surface by the band B', they will mostly find their way up into the cylinder A, where it is light, except when a large swarm of flies is crowded in under the cone, from whence many are liable to escape, to guard against which the springs E are provided, enabling a child or any person present, by a light pressure upon the cover, the springs readily yielding, to force the cylinder down upon the bottom plate, cutting off the escape of the flies and frightening them into the trap. On removing the pressure the springs readily adjust themselves to the staples $e$, and the trap is set for further use, as represented in Fig. 1.

We are aware that cylinders, cones, and feeding-receptacles have been used in fly-traps previously to this time, and are not new of themselves. We do not, therefore, claim them, nor do we claim the tin bands and strips as our invention; but the gist of our invention consists in providing springs, as described, and for the purposes set forth, and it is evident that these springs can be changed as to form and mode of attachment, and may be fixed either to the bottom, as shown, or to the cylinder part, and be used with or without the bottom part, and yet be within the invention.

Having thus fully described our invention, what we claim as new, and desire to secure by Letters Patent, is—

1. The spring-supports E, substantially as shown and described, in combination with cylinder A, as and for the purposes set forth.

2. The bottom plate D, provided with grooves $d$, springs E, and staples $e$, substantially as shown and described.

3. The springs E and staples $e$, in combination with the base D and cylinder A, substantially as shown and described.

4. The combination of the bottom plate D, springs E, staples $e$, and knobs $e'$ with the wire-cloth cylinder A and cone $c$, all constructed and operating as shown and described.

In testimony that we claim the foregoing as our own we herewith affix our signatures in presence of two witnesses.

CHAS. B. RUKGABEE.
    HORACE CLARKE.

Witnesses:
 M. T. BEVANS,
 A. T. BROOKS.